June 17, 1947.     R. T. ADAMS     2,422,281
APPARATUS FOR INSULATING CONDUCTORS
Filed Feb. 9, 1944

INVENTOR
R. T. ADAMS.
BY
ATTORNEY

Patented June 17, 1947

2,422,281

UNITED STATES PATENT OFFICE 2,422,281

APPARATUS FOR INSULATING CONDUCTORS

Robert T. Adams, Baltimore, Md., assignor to Western Electric Company, Incorporated, New York, N. Y., a corporation of New York Application February 9, 1944, Serial No. 521,643

6 Claims. (Cl. 91—53)

This invention relates to apparatus for insulating conductors.

In the manufacture of textile insulated conductors, it is sometimes necessary to impregnate the textile coverings thereof with a waterproofing and insulating material.

An object of the invention is to provide new and improved apparatus for insulating conductors.

One device embodying the invention comprises a die having an opening provided with bell-shaped portions at each end thereof, means for heating the die, and means for feeding a thermoplastic material to the entrance of the opening.

A complete understanding of the invention may be obtained from the following detailed description of a specific embodiment thereof, when read in conjunction with the appended drawings, in which.

Referring in detail to the drawings, a conductor 10, which may comprise a single wire or a plurality of conductors twisted together, is drawn from a suitable source of supply (not shown) through a knitting head 11 of a knitting machine of a conventional type by a pair of feeding and guiding rollers 12—12. As the conductor 10 is drawn through the knitting head 11, a knitted textile covering 13 is formed over the conductor 10.

Figure 1:
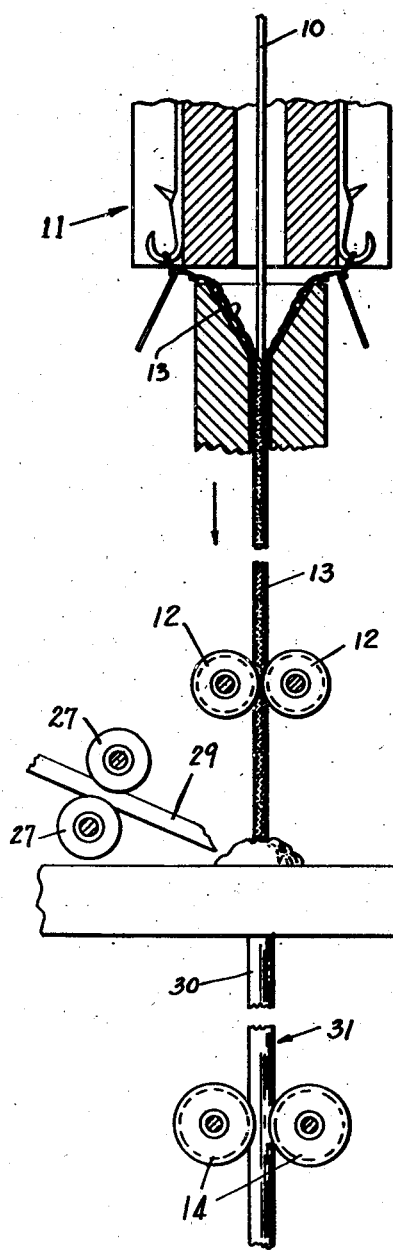
Fig. 1 is a vertical elevation of an apparatus embodying the invention.
Figure 2:
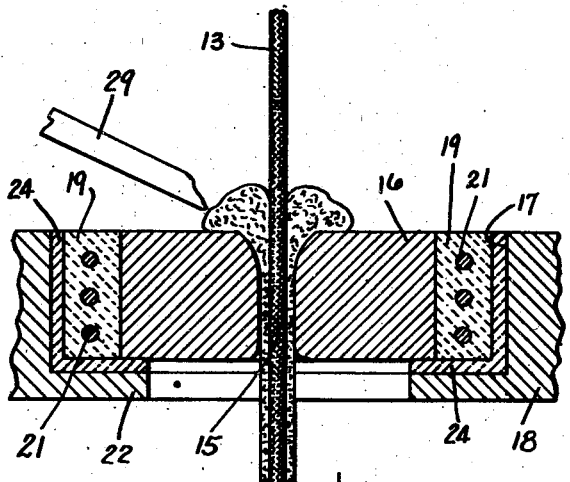
Fig. 2 is an enlarged vertical sectional view of a portion of the apparatus.

The conductor 10 with the textile covering 13 formed thereon is drawn by a pair of grooved guiding and advancing rollers 14—14 (Fig. 1) through a die opening 15 (Fig. 2) formed in a die 16. The die 16 is secured in a vertical opening 17 formed in a die-supporting block 18 and is surrounded by an insert 19. The insert 19 consists of a heating coil 21, which is connected to a source of electric current (not shown) to heat the die 16 and a mass of a suitable electrical insulating but heat-conducting material surrounding the heating coil. A flange 22 formed on the die-supporting block 18 serves to support the die 16 but is prevented from being heated by the coil 21 and the die 16 by a layer 24 of heat insulating material, such as asbestos. The layer 24 also insulates the other portions of the die-supporting block 18 from the insert 19.

Figure 3:
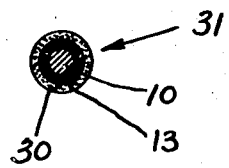
Fig. 3 is an enlarged sectional view of a conductor formed by using the apparatus.

A pair of feed rollers 27—27 (Fig. 1) driven by suitable power means (not shown) serve to feed a strip 29 of a thermoplastic material having suitable water proofing and insulating qualities to the entrance of the die opening 15 (Fig. 2) where the strip 29 is heated to a liquid state by the die 16. The material forming the strip 29 may be composed of polymerized vinyl-chloride, a copolymer of vinyl-acetate and vinyl chloride, polystyrene, cellulose acetate, ester gum, tar, pitch, other bituminous materials, or any other suitable flexible thermoplastic material, and the material may contain any suitable plasticizers, if needed. The melted thermoplastic material accumulates over the entrance to the die opening 15 and the pressure of the accumulation and the movement of the conductor 10 and the textile covering 13 thereon downwardly, as viewed in Fig. 2, causes the material to flow through the entrance of and through the die opening 15. The entrance to the die opening 15 is bell-shaped and tapered and serves to build up the pressure of the accumulated thermoplastic material and thereby increase its flow. Thus, a layer 30 (Figs. 2 and 3) of the thermoplastic material is formed over the textile covering 13. The layer 30 is cooled and hardened as it is drawn from the rounded exit of the die opening 15 and with the textile covering 13 and the conductor 10 forms an insulated cord 31.

As the textile covering 13 is drawn through the die opening 15, the hot, highly liquid thermoplastic material enters the interstices of the textile covering to thoroughly impregnate the covering. The relatively cold portions of conductor 10 and covering 13, as they are initially drawn into the accumulation of hot liquid thermoplastic material, cause a firm skin of the material to be formed on the covering 13, which skin tends to center the conductor 10 and covering 13 thereon in the die opening 15. The pairs of rollers 12—12 and 14—14 also aid in centering the conductor 10 and the covering 13 thereon in the die opening 15 as they are drawn therethrough. The restoring pressure of the accumulation of the liquid thermoplastic material, if the conductor 10 and covering 13 thereon pass eccentrically through the opening 15 and thereby disturb the flow of the material through that opening, tends to center the conductor in the opening.

The thickness of the layer 30 may be controlled by varying the temperature or composition of the thermoplastic material to vary its viscosity, or by using dies having openings of different diameters. The size and taper of the bell-shaped entrance also affects the thickness of the layer 30. That is, if a thicker layer is desired it may be obtained by using a die having a die opening with a longer and more tapering bell-shaped entrance. Conversely, if a thinner layer is desirable, a die having a die opening with a shorter and less tapered bell-shaped entrance may be used.

In place of the knitting machine of which the knitting head 11 forms a portion, it may be desirable to use a braiding machine, a serving machine, a pulp covering machine, or any other suitable type of covering machines. Smooth, uniform coatings of any desired thicknesses may be applied to either covered or bare conductors by the process and apparatus herein described at a very low cost per unit of length of the conductors.

What is claimed is:

1. In an apparatus for covering conductors, a die having a passage formed therethrough, said passage having a bell-shaped entrance, said die having a surface surrounding the entrance of the passage for supporting thermoplastic material thereon, means for supporting the die with the bell-shaped entrance facing upwardly, means for advancing a conductor downwardly through the passage, means for guiding a conductor being advanced by the advancing means through the center of the passage, means for feeding solid thermoplastic material toward the entrance of the passage, and means for heating the die to liquefy the thermoplastic material being fed to the entrance of the passage, whereby the thermoplastic material flows around the conductor and is drawn therewith through the passage.

2. In an apparatus for covering conductors, a die having a passage formed therethrough, said passage having a bell-shaped entrance, means for supporting the die with the bell-shaped entrance directed upwardly, the surface of the die surrounding the entrance of the passage being sufficiently wide to hold material thereon, means for heating the die, means for feeding thermoplastic material to the entrance of the die, whereby the thermoplastic material is liquefied by the heated die and accumulates in the bell-shaped entrance thereof and on the surface of the die surrounding the entrance of the passage, and means for advancing a conductor downwardly through the liquefied thermoplastic material and the passage, whereby a coating of the thermoplastic material is formed on the conductor.

3. In an apparatus for impregnating textile covered conductors, a die having a tapered passage therethrough, the surface of die surrounding the larger portion of the passage being sufficiently wide to support thermoplastic material thereon, means for supporting the die in a horizontal position with the larger portion of the passage positioned at the upper surface of the die, means for feeding a strip of thermoplastic material to the upper end of the passage, a heating coil associated with the die to heat the die, whereby thermoplastic material fed by the feeding means is liquefied and accumulates over the passage, and means for advancing such a conductor downwardly through the accumulated and liquefied thermoplastic material and through the passage, whereby the covering on the conductor is impregnated with the thermoplastic material.

4. An apparatus for covering conductors, which consists of a horizontally disposed block having a vertically disposed die opening formed in the central portion thereof, said die opening having a bell-shaped upper portion, means for liquefying a thermoplastic material positioned on the top of said block, and means for advancing a conductor downwardly through said die opening.

5. An apparatus for covering conductors, which consists of a horizontally disposed block having a vertically disposed die opening formed in the central portion thereof, said die opening having a tapered entrance portion, said block having a top surface surrounding the entrance portion of the die opening for supporting thermoplastic material thereon, means for heating the thermoplastic material positioned on said supporting surface of the block, and means for advancing a conductor downwardly through said die opening.

6. An apparatus for covering conductors, which consists of a horizontally disposed block having a vertically disposed die opening formed centrally therein, said block having on the top thereof a surface surrounding the die opening for supporting a covering material, the top portion of said die opening being bell-shaped and the lower portion of said die opening being rounded, means for heating said block to liquefy the covering material, and means for advancing a conductor downwardly through said passage.

ROBERT T. ADAMS.

REFERENCES CITED

The following references are of record in the file of this patent:

UNITED STATES PATENTS

| Number | Name | Date |
|---|---|---|
| 2,291,720 | Hukle | Aug. 4, 1942 |
| 1,972,756 | Blaisdell | Sept. 4, 1934 |
| 2,057,789 | Petersen | Oct. 20, 1936 |
| 1,094,879 | Cobb | Apr. 28, 1914 |
| 1,646,825 | Kochendorfer | Oct. 25, 1927 |
| 1,802,605 | Kemp | Apr. 28, 1931 |
| 2,199,067 | Bradt | Apr. 30, 1940 |
| 2,354,260 | Haney et al. | July 25, 1944 |
| 2,011,615 | Choice et al. | Aug. 20, 1935 |
| 2,155,403 | Cook | Apr. 25, 1939 |
| 2,293,379 | Bruining | Aug. 18, 1942 |